T. D. MEREDITH.
CLIP FOR STOPPING LEAKAGE IN DAMAGED PIPES.
APPLICATION FILED APR. 2, 1919.
1,343,463.  Patented June 15, 1920.
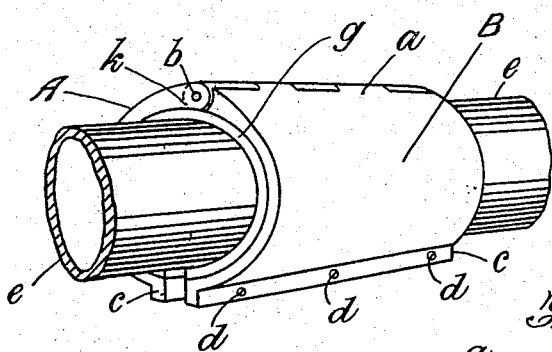
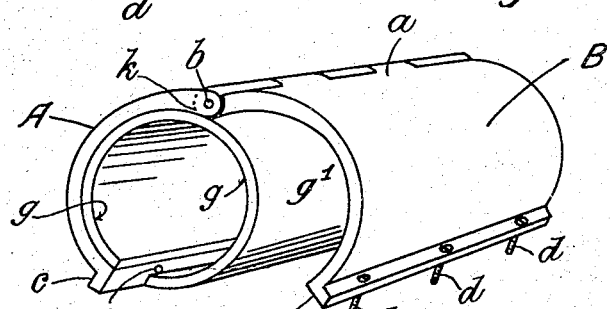
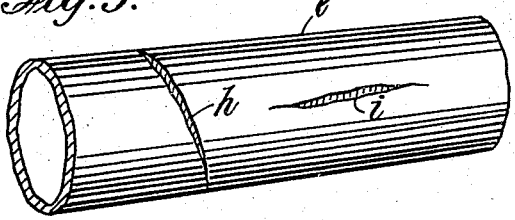

UNITED STATES PATENT OFFICE.

THOMAS DAVIES MEREDITH, OF LONDON, ENGLAND.

CLIP FOR STOPPING LEAKAGE IN DAMAGED PIPES.

1,343,463.   Specification of Letters Patent.   Patented June 15, 1920.

Application filed April 2, 1919. Serial No. 287,068.

*To all whom it may concern:*

Be it known that I, THOMAS DAVIES MEREDITH, of 147 Abbeville road, Clapham, London, England, builder, have invented new and useful Improvements in Clips for Stopping Leakage in Damaged Pipes; and I do hereby declare that the following is a full, clear, and exact description of the same, reference being had to the accompanying drawings, forming a part hereof.

My invention, which will be hereinafter fully set forth and claimed, relates to an improved clip in the form of a sleeve to fit over the damaged part of the pipe; and, in accordance with this invention, is in two halves (divided longitudinally) and hinged together so that it can be opened to place over the damaged part of the pipe.

The edge of each section of the sleeve is formed with an outwardly projecting flange along its length suitably drilled for the reception of fastening screws by which, when the sleeve is placed around the broken pipe, it may be tightened up to stop the leak.

The hinged part of the sleeve is made thicker than the other part so that the barrel for the hinge pin finishes flush inside and outside the clip.

The clip is lined with a rubber strip of a width equal to the internal circumference of the clip, said rubber lining being for one half of its width fixed to the inner surface of one half of the hinged clip and the other half of said lining being loose, thus permitting of the free working of the hinge.

In the drawings:—

Figure 1 in perspective view, shows the clip constructed in accordance with this invention, fitted upon a pipe.

Fig. 2, in similar view, shows the clip in its open position ready for adjustment upon a pipe.

Fig. 3, also in perspective, shows a pipe with a cross burst and a straight burst.

Like letters refer to like parts where occurring.

The clip as aforesaid is in the form of a sleeve adapted to encircle a pipe at its burst part, and is divided longitudinally into halves "A" and "B," the two portions being hinged together as at $a$. The part $a$ is made thicker than the other part of the clip so that the barrel there formed for the hinge pin $b$ finishes flush inside and outside the clip.

$c$ $c$ are outwardly projecting flanges formed along the free edges of the two parts "A" and "B" of the hinged clip suitably drilled for the reception of the screws $d$ by which, when in position around the pipe $e$, the clip is tightened up to stop the leak.

$g$ $g'$ is the rubber lining having one half $g$ fixed to the inner surface of the side "A" of the clip, and its other half $g'$ loose.

$h$ and $i$ Fig. 3 indicate respectively a cross burst and a straight burst in a pipe $e$.

In operation, the clip is opened out and placed around the burst portion of the pipe, the loose portion of the rubber strip forming the lining permits free movement of the parts at the hinge $k$, and the sides "A" "B" of the clip are closed upon the pipe and tightened up to the required extent by means of the screws $d$ passed through the flanges $c$ of the clip.

Having fully described my invention, what I claim as new and desire to secure by Letters Patent is:—

1. A device of the character described comprising a pair of hingedly connected sections, a one piece lining connected to one of said sections and loose with respect to the other section and adapted to be embraced by both sections, and means for fastening the free ends of said hinged sections together.

2. A device of the kind described comprising a hinged clip with a barrel hinge having the hinged part of the clip finishing flush inside the clip, and fitted with a lining of rubber in one place, one half of which being attached to the inner surface of one section of the hinged clip, the other half is loose.

In testimony whereof I have signed my name to this specification in the presence of two subscribing witnesses.

THOMAS DAVIES MEREDITH.

Witnesses:
 GEO. COXHEAD,
 G. HUGHES,